United States Patent
Heldmann et al.

(10) Patent No.: US 8,292,302 B2
(45) Date of Patent: Oct. 23, 2012

(54) MOUNTING GUARD RING

(75) Inventors: Martin Heldmann, Lindenfels (DE); Gunter Hintenlang, Abtsteinach (DE); Uwe Henrich, Hemsbach (DE)

(73) Assignee: Carl Freudenberg KG, Weinheim (DE)

( * ) Notice: Subject to any disclaimer, the term of this patent is extended or adjusted under 35 U.S.C. 154(b) by 239 days.

(21) Appl. No.: 12/631,942

(22) Filed: Dec. 7, 2009

(65) Prior Publication Data

US 2010/0084417 A1   Apr. 8, 2010

Related U.S. Application Data

(60) Division of application No. 10/915,764, filed on Oct. 15, 2004, now Pat. No. 7,651,102, which is a continuation-in-part of application No. 10/850,037, filed on May 20, 2004, now Pat. No. 7,284,759.

(30) Foreign Application Priority Data

Jun. 3, 2003   (DE) .................................. 103 25 254

(51) Int. Cl.
*F16J 15/32*   (2006.01)
(52) U.S. Cl. ...................................... 277/551
(58) Field of Classification Search .................. 277/323, 277/370, 435, 551, 630
See application file for complete search history.

(56) References Cited

U.S. PATENT DOCUMENTS

| | | | |
|---|---|---|---|
| 2,860,535 A | 11/1958 | Fowler | |
| 3,030,702 A | 4/1962 | Fowler | |
| 3,165,949 A | 1/1965 | Thill | |
| 3,710,989 A | 1/1973 | Armour | |
| 3,923,315 A | 12/1975 | Hadaway | |
| 3,973,779 A | 8/1976 | Burgmann et al. | |
| 4,002,275 A | 1/1977 | Crowle et al. | |
| 4,185,665 A | 1/1980 | Flimon | |
| 4,218,813 A | 8/1980 | Cather, Jr. | |
| 4,551,898 A | 11/1985 | Provost | |
| 4,815,884 A | 3/1989 | Halliday, Jr. et al. | |
| 5,052,695 A | 10/1991 | Curtis | |
| 5,368,397 A | 11/1994 | Freiwald | |
| 5,503,404 A | 4/1996 | Newton et al. | |
| 6,357,754 B1 | 3/2002 | Rieder et al. | |
| 6,370,751 B1 | 4/2002 | Rullmann et al. | |
| 6,991,126 B2 | 1/2006 | Jackel | |
| 7,178,425 B2 | 2/2007 | Marich | |
| 7,284,759 B2 | 10/2007 | Heldmann et al. | |
| 7,651,102 B2 * | 1/2010 | Heldmann et al. | 277/551 |

(Continued)

FOREIGN PATENT DOCUMENTS

| | | |
|---|---|---|
| DE | 3838760 | 5/1990 |
| DE | 19527042 | 1/1997 |
| EP | 0942208 | 9/1999 |

*Primary Examiner* — Thomas Beach
*Assistant Examiner* — Nicholas L Foster
(74) *Attorney, Agent, or Firm* — Daniel J. Sepanik, Esq.; Harness, Dickey & Pierce, P.L.C.

(57) ABSTRACT

A mounting guard ring for a sealing ring with at least one sealing lip, surrounding a sleeve-shaped protective ring with a supporting surface for the sealing lip disposed at the outer periphery and a holding device shaped as a grip, the protective ring being provided in at least one peripheral region with a first predetermined breaking site and being capable of being severed along the first predetermined breaking site by pulling on the holding device, the protective ring being closed off in sealing manner by a disk-shaped lid.

11 Claims, 8 Drawing Sheets

U.S. PATENT DOCUMENTS

2004/0207160 A1 10/2004 von Geisau et al.
2005/0051508 A1 3/2005 Hackmann et al.
2005/0102986 A1 5/2005 Gosweiler

* cited by examiner

MOUNTING GUARD RING

CROSS-REFERENCE TO RELATED APPLICATIONS

This application is a divisional of application Ser. No. 10/915,764, filed Oct. 15, 2004, which is a continuation-in-part of application Ser. No. 10/850,037 filed May 20, 2004, which claims the benefit of German Patent Application 103 25 254.1, filed Jun. 3, 2003. The disclosure of the above applications are incorporated herein by reference in their entirety.

FIELD OF THE INVENTION

The present invention relates to a mounting guard ring.

BACKGROUND OF THE INVENTION

Mounting guard rings are known, for example, from DE 38 38 760. In essence, a mounting guard ring consist of a plastic protective ring which, on its outer periphery, has a supporting surface for the sealing lip of a sealing ring. The sealing ring is pushed onto the supporting surface.

Mounting guard rings are used for the storage and transportation of sealing rings, particularly sealing rings with PTFE sealing lips, because without being subjected to pressure such rings have a tendency to undergo elastic recovery as a result of a memory effect.

Moreover, mounting guard rings are used in the mounting of sealing rings onto a shaft. During the mounting of the sealing ring onto a shaft, the protective ring of the mounting guard ring protects the sealing lip of the sealing ring from damage by sharp-edged transition regions or sharp-edged profiles as, for example, multi-tooth or grooved wedge profiles. When passing over sharp-edged transition regions or profiles, the sealing lips of sealing rings can be damaged which would cause immediate leakage or a reduction in service life of the sealing ring. After the mounting of the sealing ring, the mounting guard ring is manually removed axially from the shaft.

Units consisting of a sealing ring and a mounting guard ring are often pre-mounted in a housing. Prior-art mounting guard rings, however, have the drawback that dirt or paint dust can penetrate into the housing through the opening of the mounting guard ring so that the housing becomes filled with a lubricant or preservative agent that cannot be transported.

SUMMARY OF THE INVENTION

In view of the above drawbacks of the prior art mounting guard rings, an object of the invention is to further develop a mounting guard ring in a manner such that no dirt can penetrate from the outside into a housing opening with a pre-mounted unit of sealing ring and mounting guard ring and that the pre-mounted housing can be filled with a lubricant or preservative agent and transported.

The above objective is reached by closing the protective ring in a sealing manner with a disk-shaped lid.

The lid of the mounting guard ring seals the housing from its surroundings. In this manner, contaminants such as paint dust are kept out of the inside of the housing, so that the housing can be filled with a lubricant or preservative agent, even before mounting. The lubricant or preservative agent is kept in the housing by the lid.

In one embodiment of the invention, the holding device can be fastened to the protective ring essentially coaxially and in a sealing manner. According to this embodiment, the holding device can be designed as a lid capable of closing the opening of the seal.

In an advantageous embodiment, the holding device is connected with the protective ring by a joint. The joint connects the holding device to the protective ring to prevent the holding device from being lost.

In another embodiment, the holding device is disposed to be able to swivel around the joint. As a result of the swivelable arrangement, the holding device can be moved out of the way when the mounting guard ring must be removed from the protective ring.

The joint is preferably configured as an integral hinge and consist of a polymeric material. Integral hinges are easy to produce and inexpensive.

The protective ring preferably consists of a polymeric material. Polymeric materials are easy to process and inexpensive.

The holding ring preferably consists of a polymeric material.

In an advantageous embodiment, the joint, the protective ring, and the holding device form a single unit made of the same material. As a result of the single-unit, one-material design, the mounting guard ring can be produced in a single processing step.

In another embodiment, a statically stressed, separately fabricated seal is disposed in a sealing manner between the lid and the protective ring. The separate seal seals the gap between the protective ring and the lid.

In yet another embodiment, the lid consists of an elastomeric sealing material. In this embodiment, the gap between the protective ring and the lid is sealed by the elastic lid.

In still another embodiment, the holding device and the lid are made as a single unit, of the same material, and are fastened to each other via a predetermined breaking site. In this embodiment, the holding device and the lid are tightly connected to each other.

The mounting guard ring and the sealing ring can be combined in a single sealing arrangement. In this case, the sealing lip of the sealing ring surrounds the supporting surface of the mounting guard ring. The sealing lip is thus protected and kept under tension during transportation.

Preferably, the mounting guard ring and the sealing ring form a premountable unit. In this manner, the sealing ring is protected from damage during mounting.

Particularly preferred is a premountable unit that can be pressed into the housing opening to be sealed. In premounted housings, the housing is closed by the lid of the mounting guard ring.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
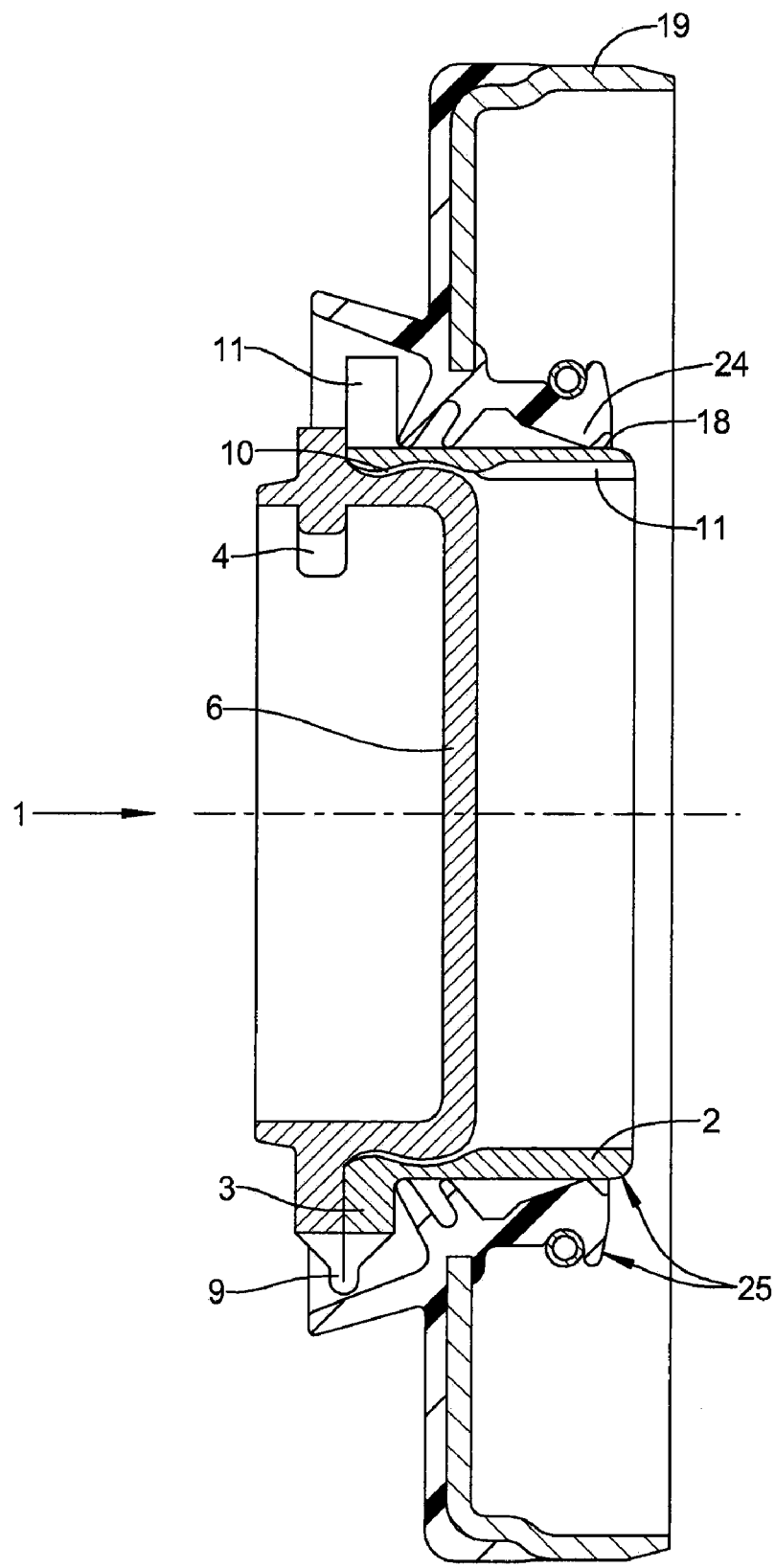
FIG. 1 shows, in longitudinal cross-section, a mounting guard ring of a one-piece design according to a principle of the present invention.

FIG. 1 shows a mounting guard ring 1 with a tubular protective ring 2. The outer periphery of the protective ring 2 forms a supporting surface 18 for a sealing lip 24 of a sealing ring 19 and an axial stop 3. The protective ring 2 and lid 6 are connected to each other by means of an integral hinge 9 to form a single piece made of the same material.

The protective ring 2 and lid 6 also have a static sealing region 10. The sealing region 10 of the protective ring 2 and lid 6 has a congruent wavy shape. The lid 6 forms a holding device 4. A first predetermined breaking site 11 is provided along the protective ring 2 and the axial stop 3. The mounting guard ring 1 and sealing ring 19 constitute a premountable unit 25.

Figure 2:
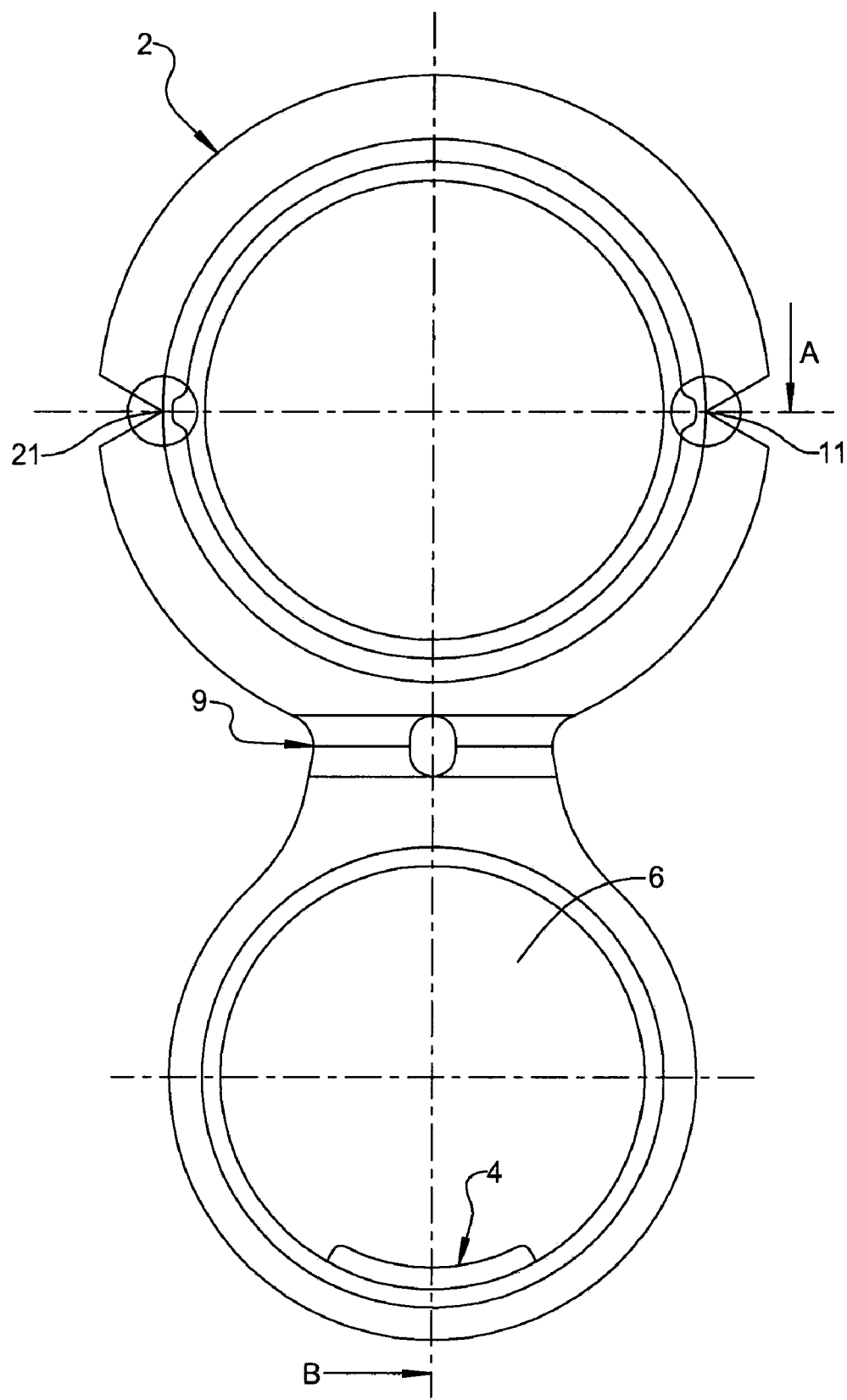
FIG. 2 shows a mounting guard ring with a swiveled-out holding device according to a principle of the present invention.

FIG. 2 shows a mounting guard ring 1 with a holding device 4 swiveled away from the protective ring 2. The lid 6 and holding device 4 are made of the same material, in one piece, and are connected to the protective ring 2 by an integral hinge 9. Along the protective ring 2, offset by 90° relative to the integral hinge 9, is axially provided a first predetermined breaking site 11. Radially opposite the first predetermined breaking site 11 is provided a joint 21. The tensile strength of the first pre-determined breaking site 11 is less than the tensile strength of integral hinge 9 and joint 21.

Figure 3:
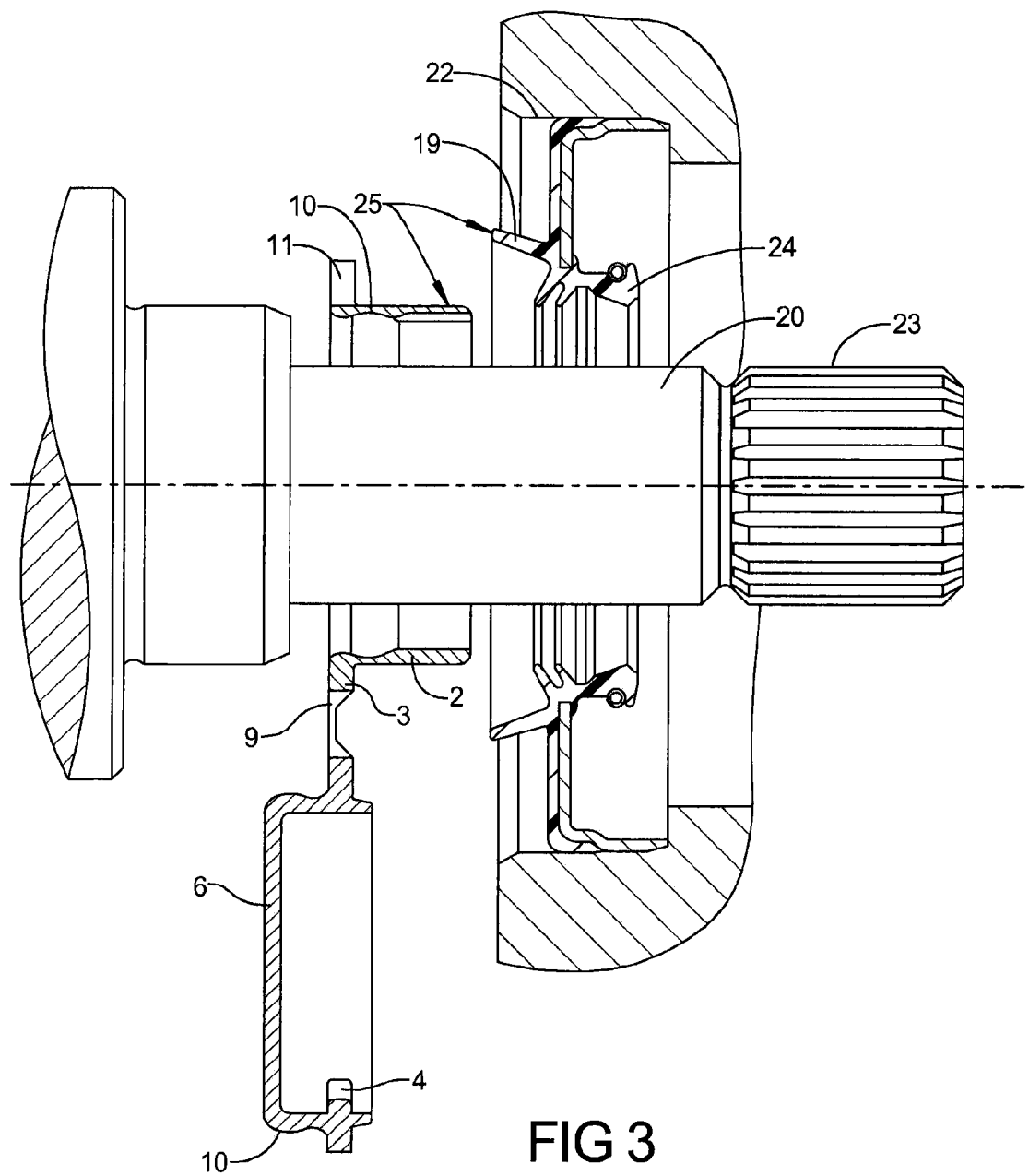
FIG. 3 shows the mounting of a shaft.

FIG. 3 shows a mounting guard ring for a shaft 20. A unit 25 that consists of the sealing ring 19 and the mounting guard ring 1 is mounted in a housing opening 22 provided for this purpose. Before the shaft 20 is mounted, the lid 6 is swiveled away from protective ring 2. After the sharp-edged region 23 of shaft 20, in this drawing a multi-toothed part, is passed through the opening of protective ring 2, the mounting guard ring 1 is axially removed from the sealing ring 19 over the holding device 4. By pulling on the holding device 4, the mounting guard ring 1 breaks off along the first predetermined breaking site 11 and can be bent over the joint 21. The mounting guard ring 1 can then be removed, although the mounting guard ring 1 cannot be axially moved over the shaft 20.

Figure 4:
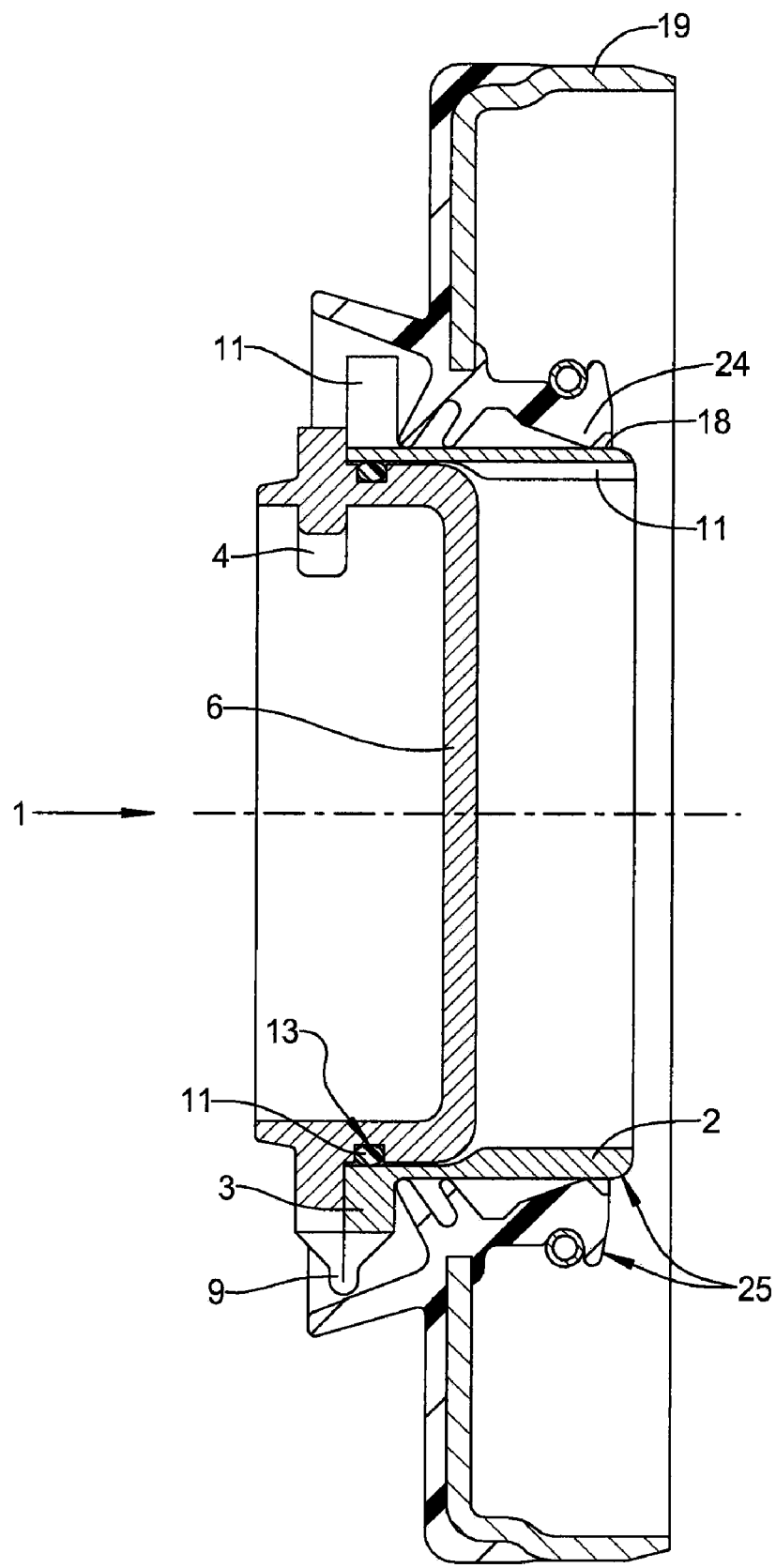
FIG. 4 shows, in longitudinal cross-section, a mounting guard ring of one-piece design with an additional sealing body according to a principle of the present invention.

FIG. 4 shows an embodiment according to FIG. 2 in which a seal between the mounting guard ring 1 and lid 6 is provided by a sealing body 12. The sealing body 12, in this case an O-ring, is disposed in an all-around groove 13 of the lid 6.

Figure 5:
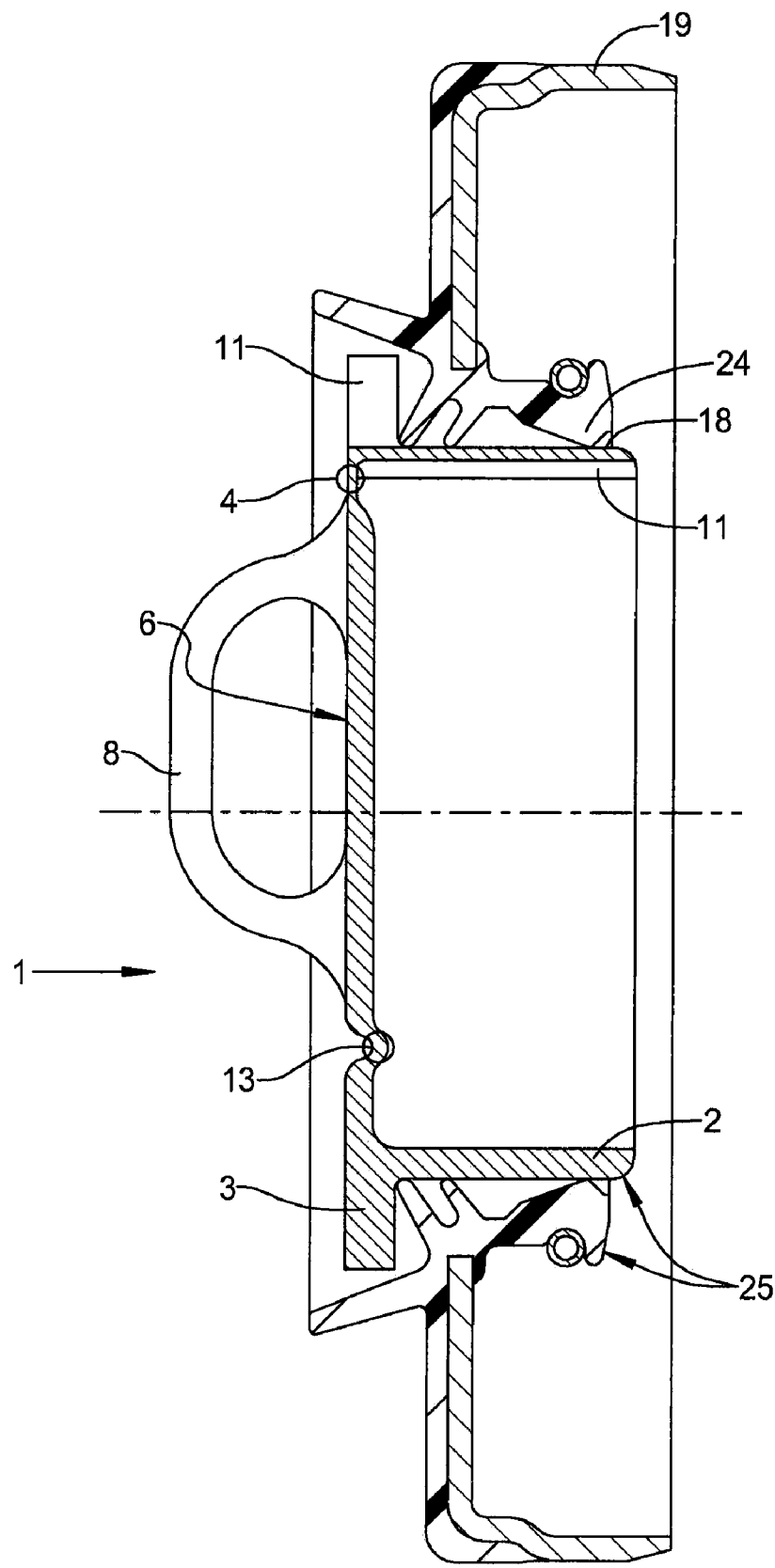
FIG. 5 shows a mounting guard ring of one-piece design with a second predetermined breaking site at the transition from the mounting guard ring to the lid according to a principle of the present invention.

FIG. 5 shows another mounting guard ring 1 according to the present invention. At the front side of the mounting guard ring 1 is provided a lid 6 that forms a single unit with, and made of the same material as, the protective ring 2. The lid 6 is limited by a circular second predetermined breaking site 14, and by an integral hinge 9. By pulling on a grip 8 that is fastened to the lid 6, the second predetermined breaking site 14 is broken, and the lid 6 is swiveled away from the protective ring 2 by the integral hinge 9. The grip 8 serves, at the same time, as a holding device for removing the mounting guard ring 1 after the sealing ring 19 has been mounted.

Figure 6:
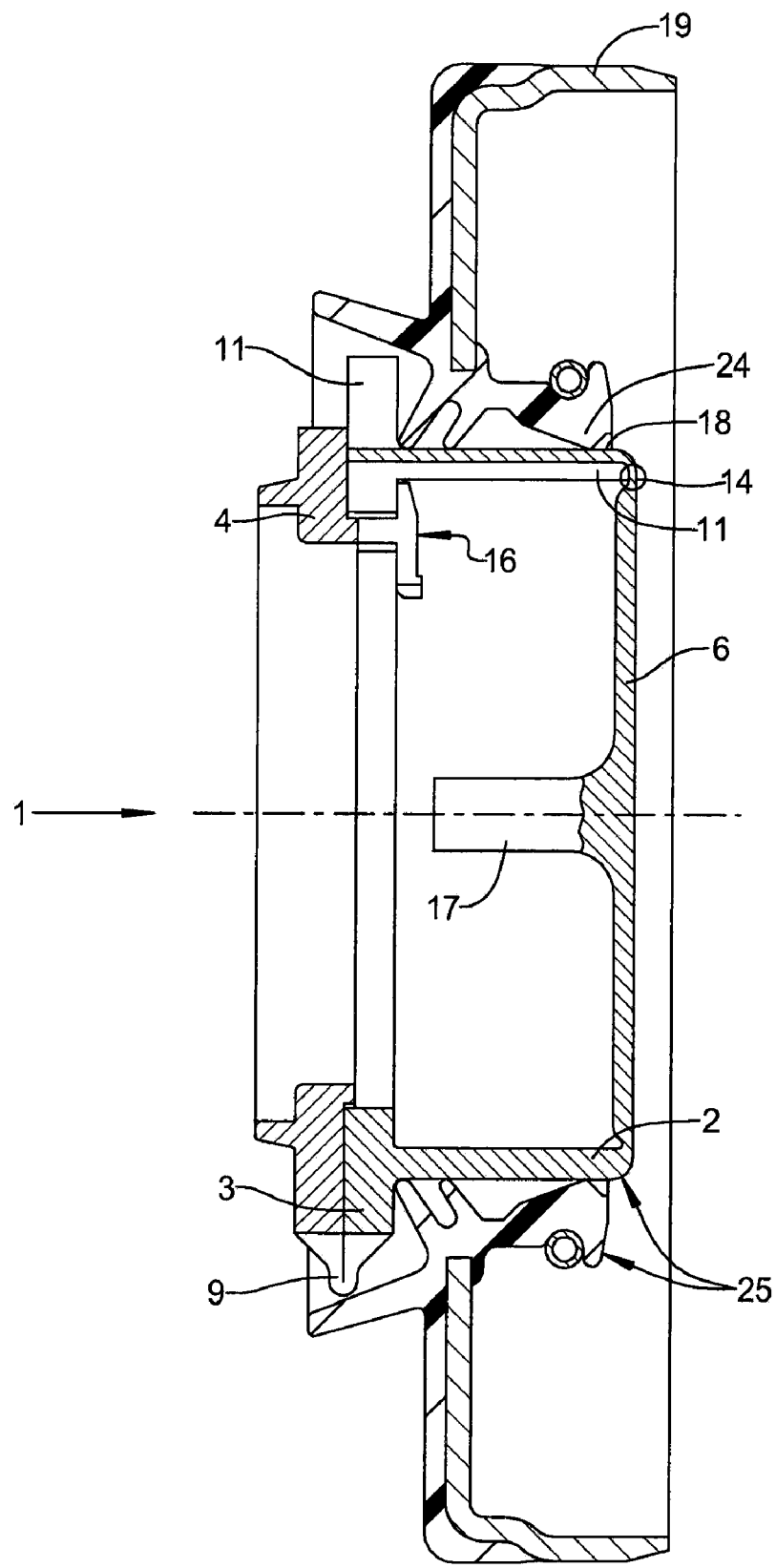
FIG. 6 shows a mounting guard ring of one-piece design with an additional holding device according to a principle of the present invention.

FIG. 6 shows, on one front end of the protective ring 2, a mounting guard ring 1 with a lid 6 that is made of the same material and as a single unit. On the other front end of the protective ring 2, is a holding device 4 that is made of the same material and as a single unit. Before the sealing ring 19 is mounted, the holding device 4, which with the aid of the integral hinge 9 is capable of swinging upward, is stopped in the mounting guard ring 1 by a snap connection 16. At the transition from the protective ring 2 to the lid 6 is disposed a circular second predetermined breaking site 14. By pulling on a grip 17, the lid 6 is removed completely from the mounting guard ring 1.

Figure 7:
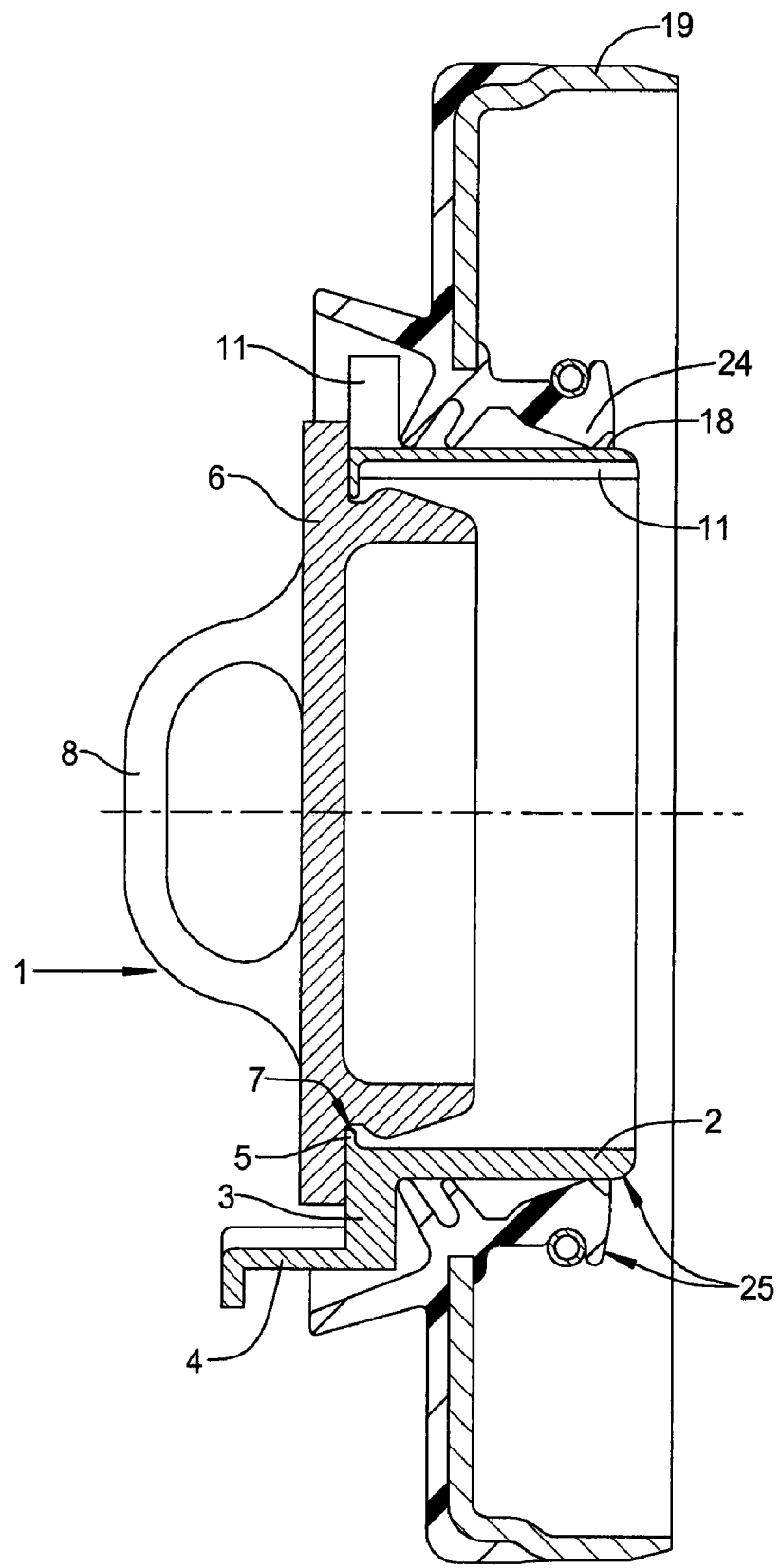
FIG. 7 shows, in longitudinal cross-section, a mounting guard ring of a two-piece design according to a principle of the present invention.

FIG. 7 shows a mounting guard ring 1 with a tubular protective ring 2. An outer periphery of the tubular protective ring 2 forms a supporting surface 18 for a sealing ring 19 with an axial stop 3. At or on the axial stop 3 is provided a holding device 4 whereby the mounting guard ring 1 can be removed after the sealing ring 19 has been mounted. At or on the inner periphery of protective ring 2 is provided an all-around projection 5. Behind the projection 5, the lid 6 snaps into an all-around recess 7 in the mounting guard ring 1. Alternatively, the lid 6 may include the all-around recess 7 that snaps into the mounting guard ring 1. A grip 8 is provided on the lid 6 for removing the lid 6. Furthermore, the mounting guard ring 1 and sealing ring 19 may form a premountable unit 25.

Figure 8:
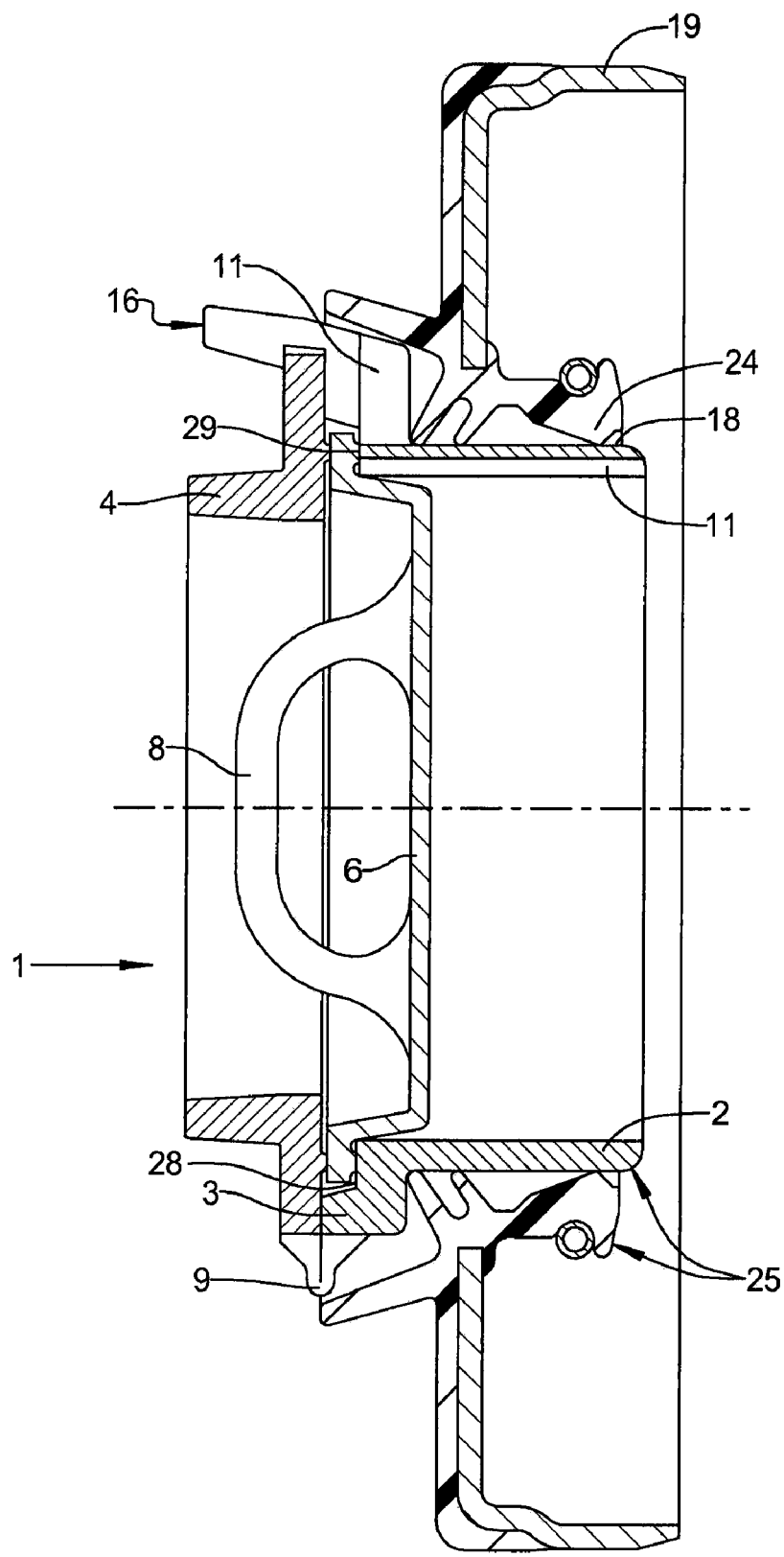
FIG. 8 shows, longitudinal cross-section, a mounting guard ring according to a principle of the present invention.

FIG. 8 shows a mounting guard ring 1 with a tubular protective ring 2. The outer periphery of the tubular protective ring 2 forms a supporting surface 18 for a sealing lip 24 of a sealing ring 19. The tubular protective ring 2 also includes an axial stop 3 for the sealing ring 19. By means of an integral hinge 9, the protective ring 2 and holding device 4 are connected to each other so as to form a single piece made of the same material. A lid 6 with a grip 8 is disposed in a recess 28 on the front side 29 of protective ring 2. A snap-on connection 16 of the holding device 4 presses the lid against protective ring 2 in a sealing manner. Along the protective ring 2 and axial stop 3 is axially provided a first predetermined breaking site 11. Further, the mounting guard ring 1 and sealing ring 19 may form a premountable unit 25.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mounting guard ring comprising:
a tubular protective ring including an internal recess;
a holding device connected to said protective ring;
a lid disposed between said protective ring and said holding device inside said internal recess of said protective ring; and
a sealing ring supported by said protective ring;
wherein said protective ring is provided with a predetermined breaking site;
wherein said protective ring and said holding device are connected by an integral hinge; and
wherein said holding device is swivelable about said integral hinge.

2. The mounting guard ring according to claim 1, wherein said protective ring and said holding device comprise the same material.

3. The mounting guard ring according to claim 1, wherein said protective ring further comprises a joint disposed opposite said breaking site.

4. The mounting guard ring according to claim 3, wherein a tensile strength of said breaking site is less than a tensile strength of said joint.

5. The mounting guard ring according to claim 1, wherein said protective ring and said sealing ring form a premountable unit.

6. A mounting guard ring comprising:
a tubular protective ring including an internal recess;
a holding device connected to said protective ring;
a lid disposed between said protective ring and said holding device inside said internal recess of said protective ring; and
a sealing ring supported by said protective ring;
wherein said protective ring is provided with a predetermined breaking site;
wherein said holding device further comprises a snap-on connection that presses said lid against said protective ring in a sealing manner.

7. The mounting guard ring according to claim 6, wherein said lid further comprises a handle.

8. A mounting guard ring for inserting a seal into a space to be sealed, comprising:
a tubular protective ring defining an internal recess;
a lid disposed inside said internal recess of said protective ring; and
a sealing ring including the seal supported by said protective ring;
wherein said protective ring is provided with a predetermined breaking site that enables said protective ring to be detached from said sealing ring after said sealing ring is inserted into the space to be sealed;
wherein said lid is connected to said protective ring by a hinge integral with said lid and said protective ring.

9. A mounting guard ring for inserting a seal into a space to be sealed, comprising:
a tubular protective ring defining an internal recess;
a lid disposed inside said internal recess of said protective ring; and
a sealing ring including the seal supported by said protective ring;
wherein said protective ring is provided with a predetermined breaking site that enables said protective ring to be detached from said sealing ring after said sealing ring is inserted into the space to be sealed;
wherein said lid is integral with said protective ring and includes another predetermined breaking site that enables said lid to be removed from said recess.

10. A mounting guard ring for inserting a seal into a space to be sealed, comprising:
a tubular protective ring defining an internal recess;
a lid disposed inside said internal recess of said protective ring; and
a sealing ring including the seal supported by said protective ring;
wherein said protective ring is provided with a predetermined breaking site that enables said protective ring to be detached from said sealing ring after said sealing ring is inserted into the space to be sealed;
further comprising a holding device connected to said protective ring;
wherein said holding device is connected to said protective ring by a snap-on connection.

11. A mounting guard ring for inserting a seal into a space to be sealed, comprising:
a tubular protective ring defining an internal recess;
a lid disposed inside said internal recess of said protective ring; and
a sealing ring including the seal supported by said protective ring;
wherein said protective ring is provided with a predetermined breaking site that enables said protective ring to be detached from said sealing ring after said sealing ring is inserted into the space to be sealed;
further comprising a holding device connected to said protective ring;
wherein said lid is disposed between said holding device and said protective ring, and said holding device secures said lid in said recess.

* * * * *